UNITED STATES PATENT OFFICE.

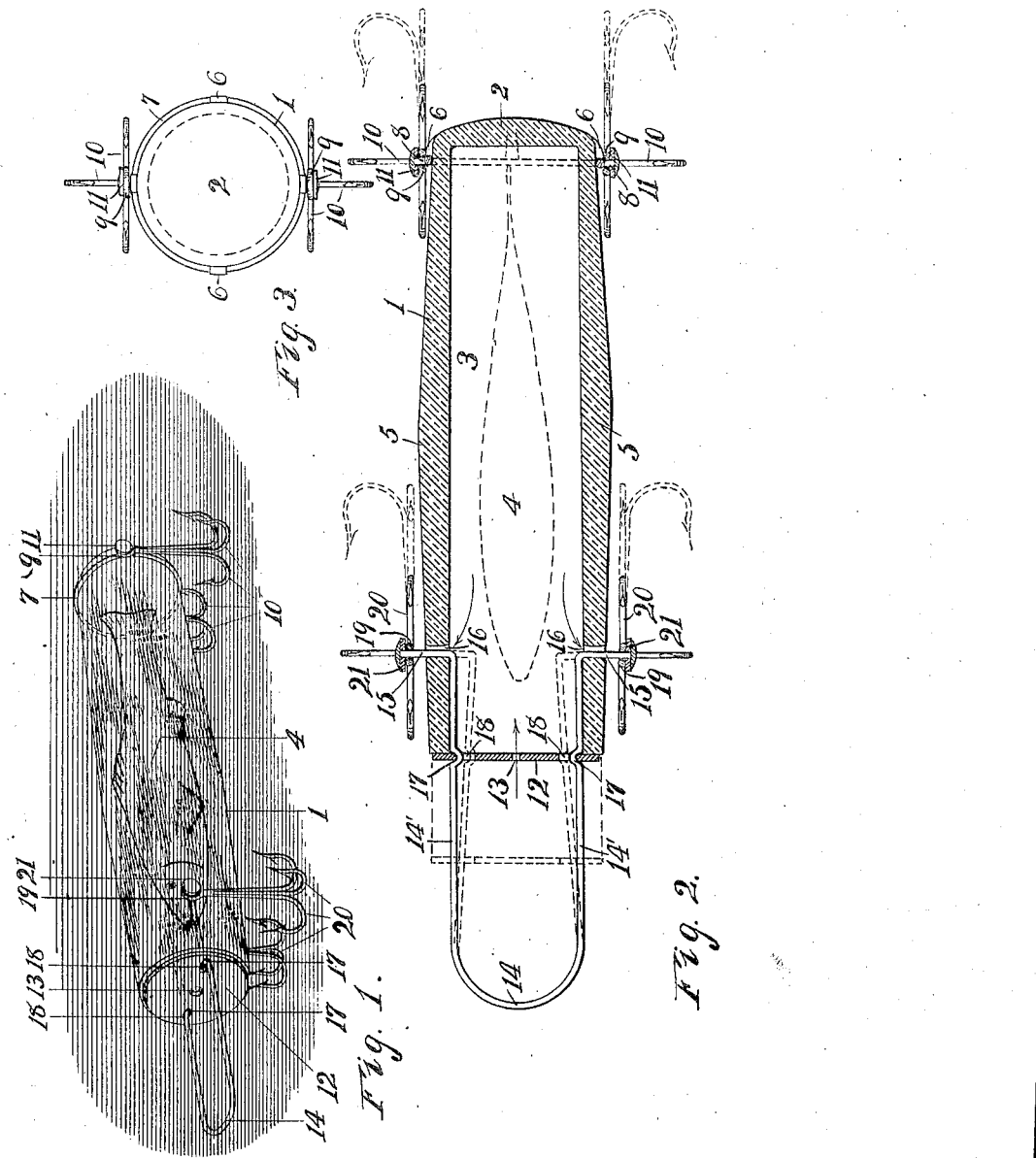

BYRON G. PFEIFFER, OF DETROIT, MICHIGAN.

FISH-BAIT HOLDER.

1,089,074.

Specification of Letters Patent.

Patented Mar. 3, 1914.

Application filed October 13, 1913. Serial No. 794,776.

*To all whom it may concern:*

Be it known that I, BYRON G. PFEIFFER, a citizen of the United States, residing at Detroit, in the county of Wayne, State of Michigan, have invented certain new and useful Improvements in Fish-Bait Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in fishing-tackle, and particularly to means for holding and displaying live bait in connection with groups of hooks at the end of a line for casting and trolling.

The object of the invention is to provide simple and efficient means for exposing live bait, preferably minnows, to the vision of the fish to be caught in such manner as to lure the fish to take the bait and become ensnared and caught upon the hooks of the device, at the same time protecting said bait from injury and preserving it alive and unharmed for further use in the same manner.

The above object is attained by the construction and arrangement of parts as illustrated in the accompanying drawings, in which:—

Figure 1 is a perspective view of the hooks and bait receptacle containing a minnow as bait in position for operation, as it would appear immersed in water. Fig. 2 is a horizontal longitudinal section through the receptacle taken on dotted line 2—2 of Fig. 1, the position of the bait contained within the receptacle being indicated by dotted lines. Fig. 3 is a rear end elevation of the device showing manner of attaching groups of hooks on opposite sides thereof.

Referring to the drawings by the characters of reference marked thereon, 1 represents a transparent cylindrical tube closed at one end by a convexed head 2 formed integral therewith and open at its opposite end in the form of a cup or receptacle having an elongated cylindrical chamber 3 therein for the reception of a minnow or other live bait 4, as shown in Figs. 1 and 2. The side walls of the cup or receptacle 1, which is preferably made of glass, are thickened at points midway the length thereof as at 5, forming a convex or crowning exterior surface to said receptacle extending from the center toward the ends thereof, whereby the body of the receptacle is braced and strengthened against lateral strain, and a lens or magnifying effect is produced upon the bait contained therein, which tends to enlarge and intensify the reflection of the bait when said receptacle is filled with water.

Formed upon the periphery of the receptacle 1, near the closed end thereof, are a series of lugs 6 forming shoulders against which a wire ring 7 encircling the receptacle is seated to prevent its withdrawal from said receptacle, said ring 7 being provided upon opposite sides thereof with radially projecting stems 8, which receive the eyes 9 formed at the upper ends of a cluster of barbed hooks 10, whereby said hooks are pivotally attached to said ring in a manner free to swing thereon. To secure the eyes of said hooks from disengagement with said stem, washers 11 are seated upon the ends of said stems, being riveted or soldered thereto, as clearly shown in Fig. 2.

The forward or open end of the receptacle 1 is provided with a disk cap or closure 12 having a central aperture 13 formed therein, through which a jet of water may flow to the interior or chamber 3 of the receptacle, said closure being held in contact with the end of said receptacle by means of a spring wire yoke 14. The free ends 15 of the side members 14' of said yoke, being bent or formed at right-angle to said side members, are passed through apertures 16 formed diametrically through the wall of said receptacle at points near the forward end thereof. The side members 14' of said yoke are provided with reversely opposed off-set depressions 17 formed therein at points in line with the body of the closure 12, said off-set portions lying in elongated apertures 18 formed through the body of said closure at diametrically opposite points near the periphery thereof, the depressions 17 of said side members engaging the walls of the elongated apertures 18 at the outermost ends thereof and normally lock and hold said closure in position against the end of the receptacle (see Fig. 2). The apertures 16 formed through the wall of the receptacle 1 are sufficiently larger than the diameter of the end portions 15 of the wire yoke 14 to leave an unfilled space between said end portions and the wall of said apertures for the exit of water from the interior of the receptacle. The extreme ends 15 of the yoke receive the eyes 19 formed in the upper ends of the groups of hooks 20, said hooks being held from disengagement with the ends of said yoke by washers 21 which are seated and held thereon by riveting or soldering in the same manner as that for attaching the groups of hooks to the rear or closed end of the receptacle as before described and shown in Fig. 2, whereby said hooks are pivotally suspended and free to swing upon the end portions of said yoke.

It will be observed that the end portions 14 of the yoke are of such length as to leave a considerable space between the inner face of the hook-eyes 19 and the outer face of the receptacle 1 to permit the depressing of the side members of the yoke within the chamber 3 by applying pressure to the ends of said yoke to force said members toward each other and cause the depressions 17 in said side members to be disengaged from contact with the ends of the apertures 18 in the closure of the receptacle, thus releasing and enabling said closure to be withdrawn from the end of said receptacle to a point upon the side members of said yoke of sufficient distance from the end of the receptacle to form an opening through which the minnow or bait may be inserted to the chamber 3 of the receptacle, as indicated by dotted lines in Fig. 2, when, by releasing the pressure upon the ends of the yoke and upon the return of the cap or closure to its position over the open end of the receptacle, said closure will be engaged and held in position by the spring tension and contact of the depressions in the side members of the yoke with the apertures in the closure through which said members pass.

The line by which the device is carried for either casting or trolling in the operation of fishing is attached to the semi-circular end of the yoke 14. The bait being placed within the chamber and the device immersed in water, the water will flow freely into the interior through the apertures in the cap or closure, thus suspending the bait or minnow within the chamber in a volume of water separate and apart from the main body of water in which the device is immersed, in which the minnow may lie and be sustained alive while being exposed in a manner to lure the fish to take it for food or attack it, and in so doing become ensnared upon the hooks that are attached to the body of the device. The bait or live minnow while contained within the receptacle and immersed in a body of water is constantly supplied with a volume of fresh water which may pass through the aperture in the closure end of the receptacle and flow out through the apertures 16 formed in the side walls thereof as the device is drawn through the water in the act of casting or trolling, as indicated by arrows in Fig. 2.

It will be apparent from the foregoing that this device will enable the use of live bait for fishing in such manner as to preserve the bait against loss or injury, enabling it to be employed in successive and repeated operations without requiring it to be renewed or replenished.

Having thus fully set forth my invention, what I claim as new, and desire to secure by Letters Patent, is:—

1. A fish-bait holder comprising a transparent cylindrical receptacle having a closed end and an open end, said receptacle adapted to be filled with water and to contain the bait, a band encircling the closed end of said receptacle having fish-hooks attached thereto, a closure for the open end of said receptacle, a yoke adapted for attachment to a fish-line attached at its ends to the open end of said receptacle and having a locking engagement with said closure, fish-hooks carried upon the ends of said yoke, and means for disengaging said yoke from locked engagement with said closure.

2. A fish-bait holder comprising a transparent cylindrical receptacle having a closed end and an open end, said receptacle adapted to be filled with water and to contain the bait, a band encircling said receptacle at its closed end having groups of fish-hooks pivotally attached thereto, a perforated closure for the open end of said receptacle, a yoke adapted for attachment to a fish-line having its free ends attached to said receptacle near the open end thereof, the side members of said yoke passing through apertures in said closure and having depressions adapted to effect a locking engagement with said closure, the free ends of said yoke having groups of fish-hooks pivotally attached thereto, the ends of said yoke adapted to be depressed within said receptacle to release said closure from locked engagement therewith.

In testimony whereof, I sign this specification in the presence of two witnesses.

BYRON G. PFEIFFER.

Witnesses:
B. F. WHEELER,
M. E. BROESAMLE.